United States Patent [19]

Fadavi-Ardekani

[11] Patent Number: 5,412,740
[45] Date of Patent: May 2, 1995

[54] SIGNAL PROCESSING SYSTEM HAVING REDUCED MEMORY SPACE

[75] Inventor: Jalil Fadavi-Ardekani, Orefield, Pa.

[73] Assignee: AT&T Corp., Murray Hill, N.J.

[21] Appl. No.: 231,346

[22] Filed: Apr. 21, 1994

Related U.S. Application Data

[63] Continuation of Ser. No. 647,325, Jan. 29, 1991, abandoned.

[51] Int. Cl.[6] .............................................. G06K 9/00
[52] U.S. Cl. ................................. 382/293; 395/425; 364/927.8
[58] Field of Search ........................ 382/41, 44, 27; 364/720, 900, 200; 395/425, 166, 164

[56] References Cited

U.S. PATENT DOCUMENTS

| | | | |
|---|---|---|---|
| 3,922,642 | 11/1975 | Tooka | 340/172.5 |
| 3,922,643 | 11/1975 | Poole | 395/425 |
| 4,153,944 | 5/1979 | Grandle, Jr. | 364/900 |
| 4,918,527 | 4/1990 | Penard et al. | 358/160 |
| 4,972,495 | 11/1990 | Blike et al. | 382/41 |
| 5,048,104 | 9/1991 | D'Aoust et al. | 382/44 |

FOREIGN PATENT DOCUMENTS

0319430  6/1989  European Pat. Off. ........ G06F 7/00

OTHER PUBLICATIONS

IEEE Transactions on Computers, Jul., 1972, "A Fast Computer Method for Matrix Transposing" by J. O. Eklundh, pp. 801 through 803.

"A Connection Between Bit Reversal and Matrix Transposition: Hardware and Software Consequences", IEEE Transactions on Acoustics, Speech and Signal Processing, vol. 38, No. 11, Nov. 1990 by Pierre Duhamel, pp. 1893–1896.

"Fast Computational Algorithms for Bit Reversal", IEEE Transactions on Computers, vol. C–23, No. 1, Jan. 1974 by Robert J. Polge, B. K. Bhagavan, and James M. Carswell, pp. 1–9.

European Search Report, 18 Aug. 1993.

*Primary Examiner*—Yon J. Couso
*Attorney, Agent, or Firm*—James H. Fox

[57] ABSTRACT

A signal processing system includes means for performing a logic function on a multi-dimensional array of information stored in a memory. Typically, the memory stores two-dimensional video information (pixels), and the logic function is a discrete cosine transform (DCT), or other linear operation. The logic function is performed on both rows and columns of the information. In the prior art, this has required two memory spaces, so that information could be written into one memory while being read out of another memory. In the present invention, a single memory space is used to transpose the information between row and column format, by performing a read-modify-write operation on each memory location in a specified sequence.

20 Claims, 3 Drawing Sheets

SIGNAL PROCESSING SYSTEM HAVING REDUCED MEMORY SPACE

This application is a continuation of application Ser. No. 07/647,325, filed on Jan. 29, 1991, now abandoned.

BACKGROUND OF THE INVENTION

1. Field of the Invention

The present invention relates to a system for performing operations on signals.

2. Description of the Prior Art

The processing of two-dimensional (2-D) signals, as for computer graphics or other video applications, often requires storing a large quantity of information (data) in an array of memory cells. For example, most high definition television (HDTV) receiver designs require storing at least one frame of video information. In most present-day HDTV designs, each frame comprises about 1,000,000 picture elements (pixels). Considering that each pixel typically comprises three color elements that each require eight bits of brightness information, the total number of binary bits that are required to define each frame is about 24 million. Other types of video displays, for example high definition graphics displays, also require a large number of bits to define each frame. Therefore, the memory requirements are a significant part of the cost of each such video receiver or computer terminal.

In many video designs, a linear transform operation is performed on the information stored in the video memory array. For example, to provide for a transmission signal having as small a bandwidth as possible, at least one of the proposed HDTV techniques performs a discrete cosine transform (DCT) on each stored frame. A typical system for performing the transform operation is shown in FIG. 4, wherein the stored information is divided into many blocks, each comprising H rows and W columns (and referred to as an "H×W block"). Next, each block (40) is processed in column format (e.g., col. 1, 2 ... W) by a transform operation (41). In order to transpose the block of information for processing in row format, two memory arrays are typically required. Information is stored in a first memory (43), while simultaneously information is read out of a second memory (44) by rows (e.g., row 1, 2 ... H). When the next block of video information that has been processed by columns arrives, it will be written into the second memory (44). Simultaneously, the first memory (43) will be read out by rows. In this manner, the information may be processed by the linear transform operation by both columns and rows, as required. This technique is often called "ping-pong" in the art.

In the special case wherein the memory array is "square" (i.e., having an equal number of rows and columns), it is known to transpose between column and row formats by simply transposing the row and column portions of the memory address bits. In that technique, first the data is written into the memory array. Then, the address bits are transposed, and the array is read out, which provides the data in the other format (e.g., row format). However, that technique does not work for "non-square" arrays (i.e., having an unequal number of rows and columns).

It can thus be seen that in a typical video graphics or HDTV application, large memory arrays are often required for transposition. It would be very advantageous to reduce the amount of memory required in such applications. Still other signal processing techniques require that data be structured in two-dimensional data arrays, and that the data be operated on by rows and by columns. For example, 2-D filtering and 2-D transform operations require that information be supplied in both column and row format. Applications include medical tomography, seismology, and radar analysis, among others.

SUMMARY OF THE INVENTION

I have invented a technique for signal processing that transposes row and column information in a single memory array. In this technique, the information that is written into the memory array is supplied in a given format (e.g, column-wise). However, the memory array is read out in specified address sequences that provide the information in another format (e.g., row-wise). After each memory location in the array is read out, the information for the next read operation is immediately written into that location. The specified address sequences may be determined using modulus arithmetic based upon the dimensions of the array.

DETAILED DESCRIPTION

Figure 1:
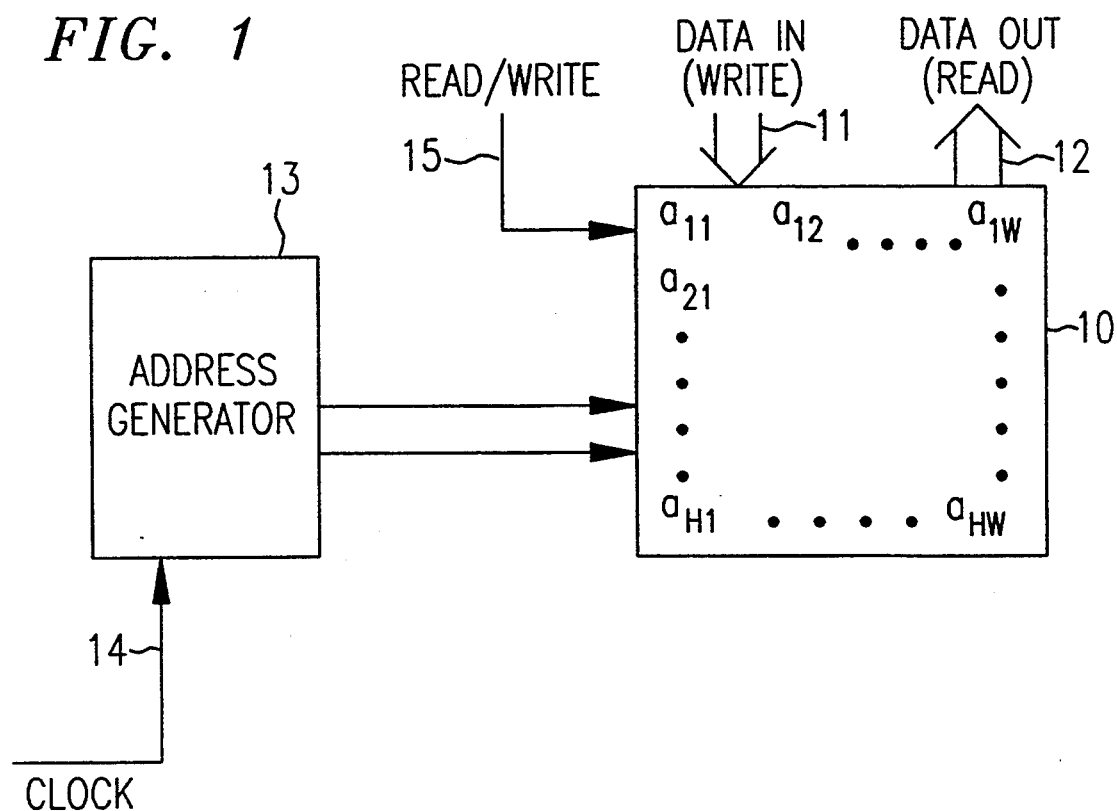
FIG. 1 shows an illustrative embodiment of a memory array and address generator according to the present invention.

The following detailed description relates to a signal processing system that includes means for transposing signals between row and column format with a single memory array. Referring to FIG. 1, a memory array 10 is illustrated wherein each of the data of a H×W block occupies a unique address location inside the memory array of the random access memory (RAM) 10. A read or write operation is selected by line 15. Any one of the address locations may be accessed by supplying the address generated by the address generator (13) to the RAM (10), with a clock signal being supplied by line 14. The row and column decoding techniques, and construction of the memory cells, may be accomplished according to principles that are well known in the art. The memory cells may be of the static, or dynamic variety. There are typically multiple bits (i.e., multiple memory cells) stored in each address location; however, it is alternatively possible that only a single bit (single memory cell) is stored in each location. In the present invention, the address generator is constructed (or controlled by software or firmware) so that the sequence of the memory addresses provides the required transposition between row and column formats, as discussed below.

Referring to Table 1 below, an illustrative data array (or a portion thereof, referred to as a "block" herein) includes six array elements. These array elements are labelled a, b, ... f in lieu of the row and column format shown in FIG. 1. Note that the data array of Table 1 is displayed as it would relate to the spatial arrangement of a 2-D data array (for example, pixels on a video screen), but that the physical locations of the memory cells may be in any convenient pattern, according to the address decoding circuitry used. In fact, a given array of data may be physically stored in multiple integrated circuit chips, if desired.

TABLE 1

DATA ARRAY
(COLUMN FORMAT)

| a | c | e |
|---|---|---|
| b | d | f |

In the illustrative embodiment, the data arrives in column format. That is, each group of six incoming data {a, b, c, d, e, f} always arrive in a sequence that is composed of the first column (a and b), followed by the second column (c and d) and the third column (e and f), etc., as defined by the HDTV or other video system in use. Within each column (for example a and b), the data related to the first row arrives first (a), followed by the data of the second row (b), etc. After transposition, we desire to read the same data array in a sequence that is composed of the first row (a, c, e), followed by the second row (b, d, f), etc. This defines the row format read operation. In the present invention, a read-and-then-write (R&W) operation is performed on each memory address location in such a manner that the incoming data in one format (e.g., column format) are stored for readout in the desired format (e.g., row format) of the stored data. Note that the read-and-then-write operation is performed on a given address location before proceeding to the next location. This type of operation is also referred to as "read-modify-write" in the memory art.

For example, referring to Table 2 below, when initializing the memory, there is no information to be read, and the initial "Read & Write Sequence" may conveniently be accomplished in the six memory locations labelled 0, 1, . . . 5. Therefore, the first group of incoming data {A1, A2, B1, B2, C1, C2} are stored in address locations 0, 1, 2, 3, 4, and 5, respectively. Table 2 shows contents of the memory at locations 0 through 5 after the above-noted six write operations.

TABLE 2

| Read & Write Sequence: | | | | | | |
|---|---|---|---|---|---|---|
| R & W Address: | 0 | 1 | 2 | 3 | 4 | 5 |
| Write Data: | A1 | A2 | B1 | B2 | C1 | C2 |

In order to read out this block of stored information in row format, it is necessary to read the memory block so that the data sequence is A1, B1, C1, A2, B2, C2, as can be seen from the general case of the data set {a, b, c, d, e, f} shown in Table 1. This can be accomplished by accessing the memory locations with the "R&W Address" sequence shown below in Table 3. Furthermore, considering that the next six incoming data are labelled {D1, D2, E1, E2, F1, F2}, (which again are arriving in column format), they will necessarily be stored (by virtue of the R&W Address sequence) as shown in the memory array in Table 3:

TABLE 3

| Read & Write Sequence: | | | | | | |
|---|---|---|---|---|---|---|
| R & W Address: | 0 | 2 | 4 | 1 | 3 | 5 |
| Write Data: | D1 | D2 | E1 | E2 | F1 | F2 |

It can be seen that the resulting memory locations of these six data are not in the same order shown in Table 2 any more. Therefore, in order to read out these six data in row format, D1, E1, F1, D2, E2, and F2, they are read out by the read & write address sequence shown in Table 4 below. Furthermore, as these six data are being read out, the next six data are arriving (in column format), and are labelled {G1, G2, H1, H2, I1, I2} respectively. Because they are written into the memory block in the same sequence as required by the read & write address sequence, they will be stored in the memory array as shown in Table 4:

TABLE 4

| Read & Write Sequence: | | | | | | |
|---|---|---|---|---|---|---|
| R & W Address: | 0 | 4 | 3 | 2 | 1 | 5 |
| Write Data: | G1 | G2 | H1 | H2 | I1 | I2 |

The next group of six incoming data arriving in column format are labelled {J1, J2, K1, K2, L1, L2}, respectively. They are treated as shown in Table 5, which results from reading out the previous block in row format, G1, H1, I1, G2, H2, I2:

TABLE 5

| Read & Write Sequence: | | | | | | |
|---|---|---|---|---|---|---|
| R & W Address: | 0 | 3 | 1 | 4 | 2 | 5 |
| Write Data: | J1 | J2 | K1 | K2 | L1 | L2 |

Finally, the next six group of six incoming data are labelled {M1, M2, N1, N2, O1, O2}, respectively. They are treated as shown in Table 6, which results from reading out the previous block in row format, J1, K1, L1, J2, K2, L2:

TABLE 6

| Read & Write Sequence: | | | | | | |
|---|---|---|---|---|---|---|
| R & W Address: | 0 | 1 | 2 | 3 | 4 | 5 |
| Write Data: | M1 | M2 | N1 | N2 | O1 | O2 |

It can be seen that these last six data are again arranged in the same order as shown for the initial six data (Table 2). Thereafter, succeeding sequences are treated in the manner shown for Tables 2 through 6 above. Hence, information that arrives in column format is transposed into row format by the above procedure. Note that in the above procedure, the address generator (13 in FIG. 1) provides the proper sequences of addresses to perform the column-to-row transformation shown in the Tables. It can be seen from the above Tables that each sequence is an ordered set of all the address locations in a given memory array (or block portion thereof). It can also be seen that each sequence differs from all the preceding sequences, until the memory array returns to its original configuration. The complete ordered set of differing sequences is referred to as a "cycle" herein, and the cycles repeat, as indicated.

The above-noted exemplary procedure may be accomplished on any rectangular memory array having dimensions of H and W, where H is the height of the array (i.e., number of rows), and W is the width of the array (i.e., number of columns). The array may be square (H=W), or alternatively rectangular (H≠W). A general logic sequence that provides the proper address sequence may be implemented using modulus arithmetic, where the value of the modulus M is: M=H×W−1.

Figure 2:
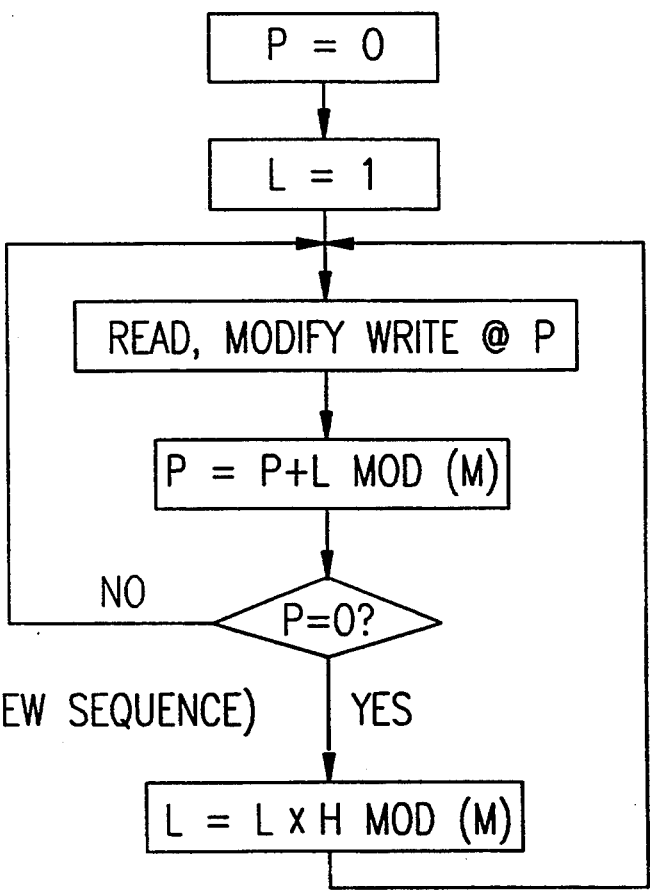
FIG. 2 shows a logic diagram for determining the sequence of memory addresses.

This logic sequence is illustrated in FIG. 2, where:

P is the "pointer" that defines the selected memory address for a given read & write operation. For example, P assumes, in various sequences, the values of 0, 1 . . . 5 in the above illustrative embodiment.

L is the "address incrementer", being the amount by which P is incremented from one read & write address to the next. For example, in Table 2 above, L=1, whereas in Table 3, L=2, and in Table 4, L=4, etc.

It can be seen that the sequential value of P in the Tables 2 through 6 is calculated using modulus 5 arithmetic (M=3×2−1). That is, when P is incremented by L to a value greater than 5, then 5 is subtracted from the result to determine the new value of P. This is expressed arithmetically in FIG. 2 as: P=P+L mod (M).

Note also from FIG. 2 that L itself may be calculated using modulus arithmetic. That is, after completing a given row-to-column transposition sequence (as shown in Table 2 for example), the pointer P returns to the first memory location (P=0), and a new value of L is calculated as follows: L=L×H mod (M).

For example, the initial value of L is 1 (Table 2); the next value of L is 1×2 (mod 5) =2 (Table 3), and the following value of L is 2×2 (mod 5)=4 (Table 4), etc. Note that as shown in FIG. 2, when the value of P returns to 0, a new value of L is calculated as described, and a new sequence begins.

Figure 3:
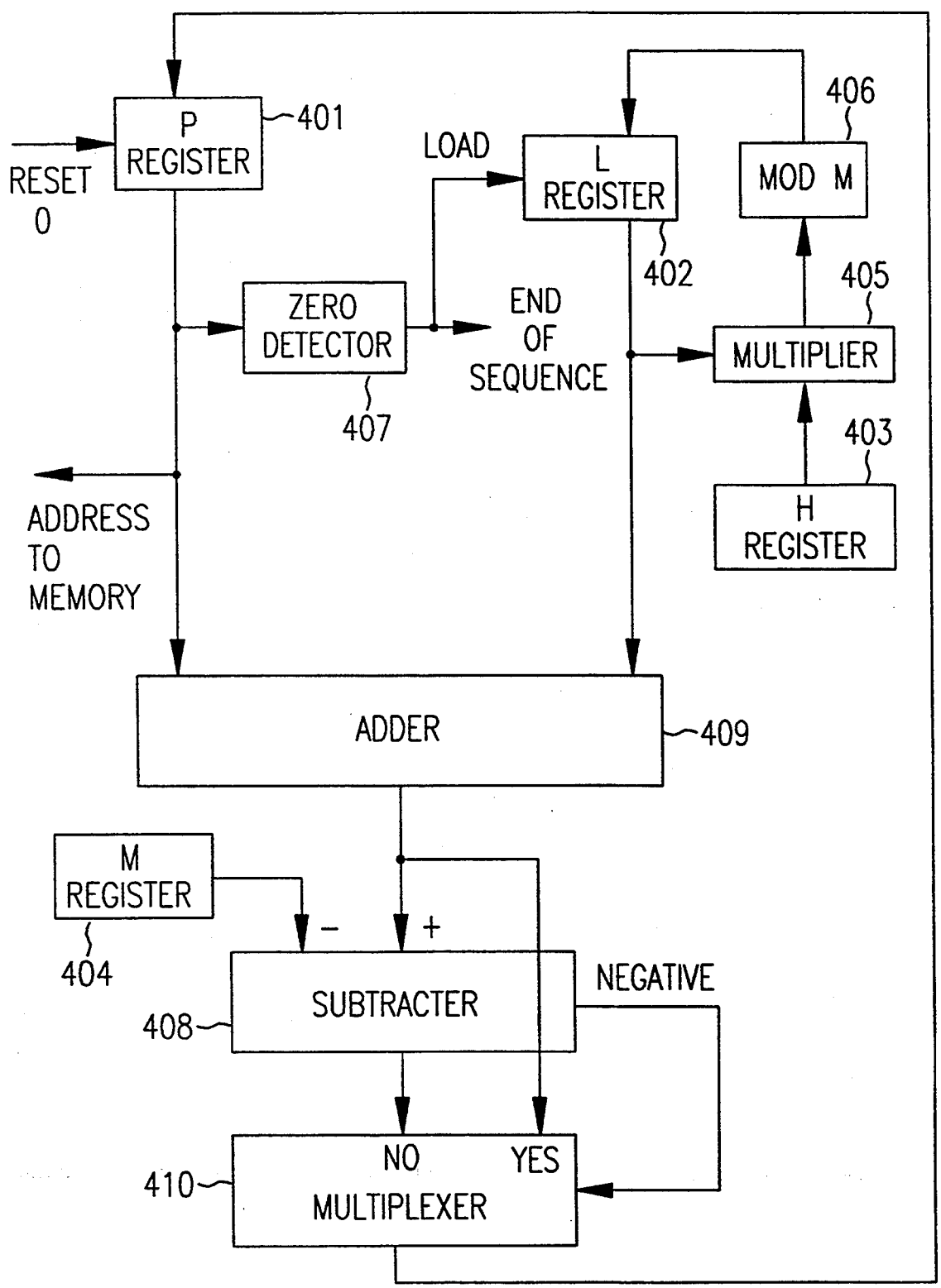
FIG. 3 shows a typical circuit block diagram for implementing the logic of FIG. 2.
Figure 4:
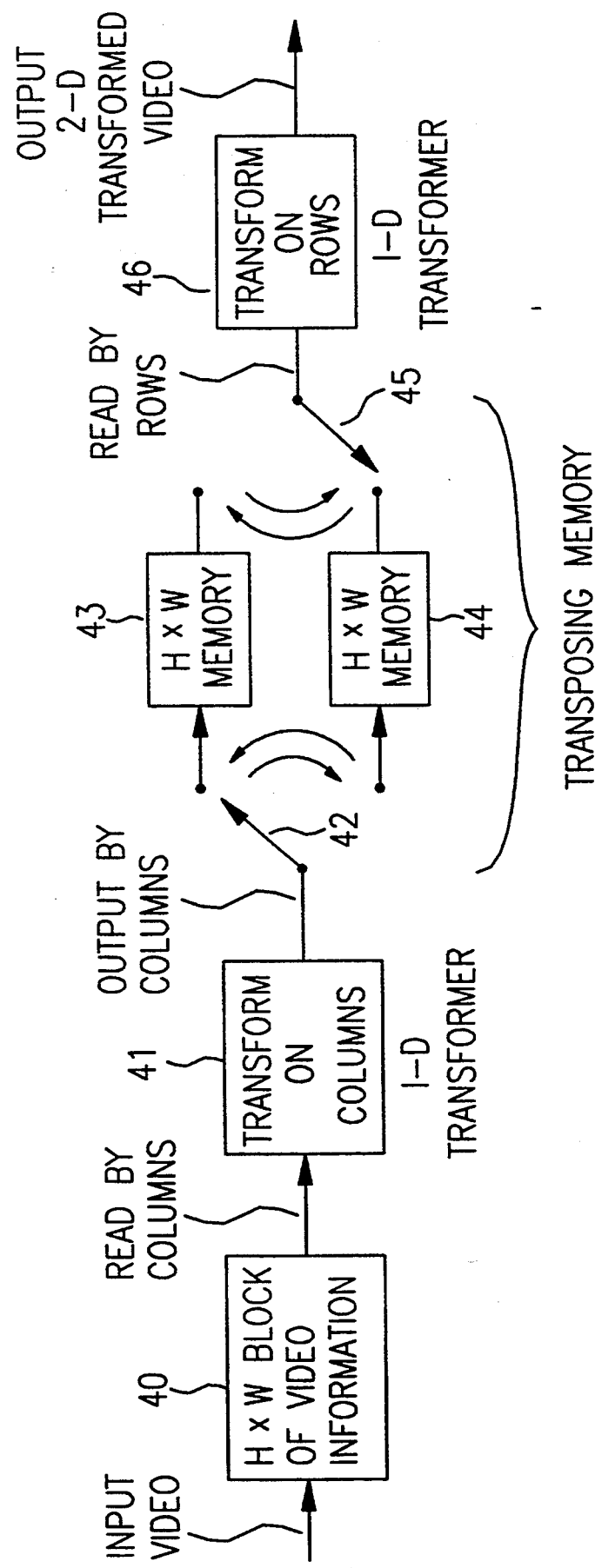
FIG. 4 shows a typical prior art arrangement of two memory arrays for providing information in both row and column formats.

The foregoing logic sequence may be implemented in circuit form using a logic block diagram as shown in FIG. 3. As shown, the values of P, L, H and M are stored in registers 401, 402, 403 and 404, respectively. The multiplier 405 and modulus M calculator 406 are used to compute the next value of L. The zero detector 407 signals when a given sequence (e.g., a given one of Tables 2 to 6 above) is complete, in which case register 402 is updated according to the above equation. The adder 409 adds the values of P and L, and the modulus arithmetic is performed using subtracter 408 and multiplexer 410.

Other implementations of the logic diagram of FIG. 2 are possible. For example, in off-line computations, high-level programming can be used to generate the addresses. Alteratively, a general purpose microprocessor may be used to perform these calculations under the control of software or firmware. In the case wherein dedicated logic is used, as in FIG. 3, the memory array and address generator (including the logic of FIG. 3) are typically formed on the same integrated circuit chip. However, the present invention may be implemented using multiple integrated circuits, as when a microprocessor is used to generate the addresses for a multiplicity of memory chips. Furthermore, while the address sequences may be computed using dedicated circuitry that implement the modulus arithmetic, other techniques for generating the address sequences are possible. For example, a read only memory (ROM) may contain the necessary sequences. Since the sequences form a closed, repetitive cycle (i.e., the sequences repeat themselves after a finite number of 2-D data arrays have been transposed), they may be implemented with still other types of logic circuitry, all of which is included herein.

While the above illustrative embodiment has shown a single transposition between row and column format, several such transpositions may be required in a given signal processing system. Hence, several memory arrays may be provided according to the inventive technique. Furthermore, the signal information may be provided in three-dimensional format, by adding a depth (D) dimension to the height (H) and width (W) dimensions shown. In that case, multiple transpositions may be accomplished to construct a three-dimensional array out of multiple two-dimensional array. Note that the designation of "row" and "column" is arbitrary insofar as the present invention is concerned, and the transposition may be accomplished in either direction. While the above illustrative embodiment has shown the general case of a non-square array, use of the present technique with a square array is also possible. Still other applications of the present technique will be apparent to persons of skill in the art.

I claim:

1. A signal processing system comprising:
   means for transposing a two-dimensional data array between row and column format, characterized in that said means for transposing comprises:
   an integrated circuit memory array having at least H×W address locations, where H is the number of rows and W is the number of columns of said two-dimensional data array, and wherein said array is non-square (H≠W);
   a P register for storing an address location (P);
   an L register for storing an incrementer (L);
   an address generator connected to said memory array for selecting each of said H×W address locations (P) in a repetitive cycle of sequences;
   means for performing modulus arithmetic on a given address location (P) in order to generate the next address location in the sequence according to formula:

$$P = \{P+L\} \bmod (M)$$

wherein L is the incrementer by which P is incremented from one address location to the next, according to the formula:

$$L = \{L \times H\} \bmod (M)$$

and
   and wherein the modulus (M) is:

$$M = H \times W - 1;$$

and further comprises means for performing a read operation followed by a write operation on each selected memory address location (P) before proceeding to the next address location in a sequence.

2. The signal processing system of claim 1 further comprising means for performing a linear transform on said data array by rows and by columns.

3. The signal processing system of claim 2 wherein said linear transform is a discrete cosine transform.

4. The signal processing system of claim 1 wherein said address generation means is located on the same integrated circuit as said memory array.

5. The signal processing system of claim 1 further comprising video display means for displaying video information that is transposed by means of said memory array.

6. The signal processing system of claim 5 wherein said video information is high definition television (HDTV) information.

7. The signal processing system of claim 5 wherein said video information is computer graphics information.

8. The signal processing system of claim 1 wherein said address generator is on the same integrated circuit as said memory array.

9. The signal processing system of claim 1 wherein said address generator is on a different integrated circuit than said memory array.

10. A method of processing a signal, comprising the step of transposing a two-dimensional data array between row and column format, characterized in that said transposing comprises the steps of:

providing an integrated circuit memory array having at least H×W memory locations, where H is the number of rows and W is the number of columns of said two-dimensional data array, and wherein said array is non-square (H≠W);

providing a P register for storing an address location (P);

providing an L register for storing an incrementer (L);

providing an address generator connected to said memory array for selecting each of said H×W locations (P) in a repetitive cycle of sequences;

providing means for performing modulus arithmetic on a given address location (P) in order to generate the next address location in the sequence according to the formula:

$$P = \{P+L\}0 \bmod (M)$$

wherein L is the incrementer by which P is incremented from one location to the next, according to the formula:

$$L = \{LxH\} \bmod (M)$$

and wherein the modulus (M) is:

$$M = H \times W - 1;$$

and performing a read operation followed by a write operation on each location (P) before proceeding to the next location in a sequence.

11. The method of claim 10 wherein the step of selecting locations includes performing modulus arithmetic on a given location (P) in order to generate the next location in a sequence according to said formula.

12. The method of claim 11 wherein said step of selecting locations includes performing modulus arithmetic on a given value of L in order to generate the next value of L for the next sequence in the cycle.

13. The method of claim 10 further comprising the step of performing a linear transform on said data array by rows and by columns.

14. The method of claim 13 wherein said linear transform is a discrete cosine transform.

15. The method of claim 10 wherein the steps of selecting locations and providing a memory array are accomplished on the same integrated circuit.

16. The method of claim 10 further comprising the step of displaying video information processed by said transposing.

17. The method of claim 16 wherein said video information is high definition television (HDTV) information.

18. The method of claim 16 wherein said video information is computer graphics information.

19. The method of claim 10 wherein said address generator is on the same integrated circuit as said memory array.

20. The method of claim 10 wherein said address generator is on a different integrated circuit than said memory array.

* * * * *